United States Patent Office 2,972,577
Patented Feb. 21, 1961

2,972,577
REMOVAL OF VANADIUM FROM PETROLEUM OILS BY PYRIDINE TREATMENT

Joel Selbin, Baton Rouge, La., assignor to American Cyanamid Company, New York, N.Y., a corporation of Maine No Drawing. Filed Oct. 22, 1957, Ser. No. 691,530

1 Claim. (Cl. 208—251)

This invention is directed to a method for the removal of vanadium from hydrocarbon oils such as petroleum crudes and distillates therefrom, and particularly from the gas oils used in catalytic cracking.

It is well known that some petroleum crudes contain vanadium compounds of a nature such that they are volatilized when the petroleum crudes are distilled and therefore contaminate the distillates. Such vanadium compounds are particularly objectionable in gas oils and other cracking stocks that are to be treated by catalytic cracking since the vanadium contaminates the catalyst and deteriorates its activity. It is a principal object of the present invention to provide a commercially feasible process for reducing the vanadium content of petroleum hydrocarbons to a level at which objectionable contamination of cracking catalysts is avoided.

Some crude petroleums, such as those obtained in Louisiana, contain practically no vanadium compounds, and therefore do not require treatment. West Texas crudes represent another class of natural petroleum that has a low vanadium content; typical samples contain only about 14 parts per million of vanadium of which only a portion is carried over into the gas oil fraction upon distillation. Venezuelan crudes and those found in certain areas of California, on the other hand, have a relatively high vanadium content, and these crudes and the distillates obtained therefrom may advantageously be purified by the process of the present invention.

It has been shown that the vanadium in crude petroleum and in petroleum fractions is present as porphyrin complexes. Thus, in Industrial and Engineering Chemistry, vol. 44 (1942), pages 1159–1165, it is shown that the crude oil from Santa Maria Valley, California, contains a vanadium complex that is similar if not identical to the vanadium complex of mesoporphyrin IX dimethyl ester having the provisional structural formula:

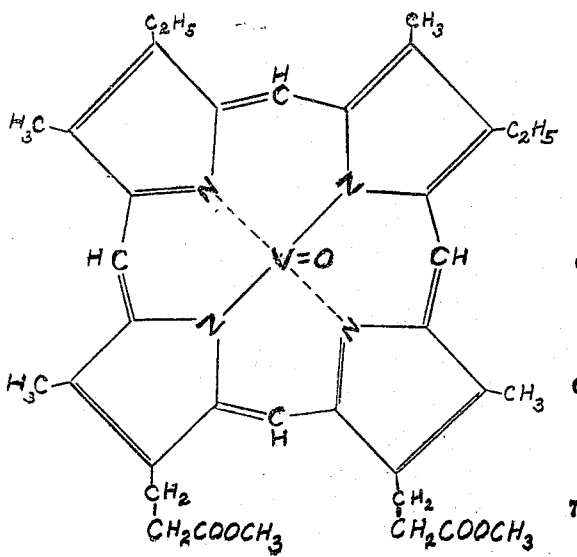

On pages 2591–2596 of the same volume it is shown that such complexes are partially volatilized when the petroleum crudes are distilled and thus appear in the distillates including the gas oil fraction.

My present invention is based on the discovery that the vanadium combined in such porphyrin complexes can be rendered non-volatile by the incorporation of an addition reagent such as a tertiary amine into the oil. When this is done the oil can then be substantially completely separated from the vanadium by distillation. The advantageous results of this method of treating vanadium-containing oils are shown by the following example.

A heavy gas oil obtained by deep vacuum reduction of Mara Western Venezuela crude was analyzed by emission spectroscopy on a total sulfated ash and found to contain 33 parts per million of vanadium. A 250 gram sample of this oil was treated by adding five drops (0.25 ml.) of pyridine and then heated slowly to 110° C. over a period of about 1 hour. The temperature was then allowed to drop to 88° C. and remain there for another hour. The material was then transferred to a weighed distilling flask surmounted by a 6-inch heated column packed with glass helices and after the addition of three drops (0.15 ml.) of pyridine it was vacuum distilled. The temperatures and pressures of the distillation and the results obtained are shown in the following table:

| Fraction | Pot Temp., °C. | Head Temp., °C. | Pressure, mm. Hg | Wt. Percent of Total | V Content, p.p.m. |
|---|---|---|---|---|---|
| 1 | to 253 | to 180 | 0.06–0.08 | 19.7 | 0.1 |
| 2 | 253–278 | 180–200 | 0.08–0.10 | 12.9 | 0.1 |
| 3 | 278–314 | 220–227 | 0.10–0.16 | 15.5 | 0.1 |
| 4 | 314–355 | 227–240 | 0.16–0.25 | 7.8 | 0.2 |
| 5 | Residue | | | 43.8 | 80 |

These test results indicate that pyridine treatment followed by distillation constitutes a feasible and commercially important method for the separation of vanadium from vanadium-containing petroleum hydrocarbon oils. Only a small quantity of pyridine is required, based on the weight of the oil, and a non-volatile pyridine-vanadium complex is apparently formed rapidly and without the necessity of extensive heating. The process can be applied to crude or topped petroleum prior to the distillation thereof or to any desired petroleum fraction that contains objectionable quantities of combined vanadium.

What I claim is:

A method of removing vanadium from a petroleum hydrocarbon oil containing vanadium combined therein as a vanadium porphyrin complex which comprises distilling said oil after adding a small quantity of pyridine thereto to form a non-volatile pyridine vanadium complex.

References Cited in the file of this patent

UNITED STATES PATENTS

| | | |
|---|---|---|
| 2,178,506 | Weir | Oct. 31, 1939 |
| 2,187,741 | Bosing | Jan. 23, 1940 |
| 2,302,319 | Henry et al. | Nov. 17, 1942 |
| 2,368,596 | Johnston | Jan. 30, 1945 |
| 2,392,846 | Friedman | Jan. 15, 1946 |
| 2,453,138 | Kharasch | Nov. 9, 1948 |
| 2,470,887 | Chenicek | May 24, 1949 |
| 2,846,358 | Bieber et al. | Aug. 5, 1958 |
| 2,922,760 | Beach et al. | Jan. 26, 1960 |

OTHER REFERENCES

Skinner: "Chemical State of Vanadium in Santa Maria Valley Crude Oil," Industrial and Engineering Chemistry, May 1952; volume 44, No. 5, pages 1159–1165.